US008463091B2

(12) United States Patent
Kewitsch

(10) Patent No.: US 8,463,091 B2
(45) Date of Patent: Jun. 11, 2013

(54) METHODS TO RECONFIGURE ALL-FIBER OPTICAL CROSS-CONNECTS

(75) Inventor: Anthony Stephen Kewitsch, Santa Monica, CA (US)

(73) Assignee: Telescent Inc., Marina del Rey, CA (US)

( * ) Notice: Subject to any disclaimer, the term of this patent is extended or adjusted under 35 U.S.C. 154(b) by 686 days.

(21) Appl. No.: 12/196,266

(22) Filed: Aug. 21, 2008

(65) Prior Publication Data
US 2009/0097797 A1 Apr. 16, 2009

Related U.S. Application Data

(60) Provisional application No. 60/980,148, filed on Oct. 15, 2007, provisional application No. 60/987,414, filed on Nov. 13, 2007, provisional application No. 61/016,794, filed on Dec. 26, 2007, provisional application No. 61/018,668, filed on Jan. 2, 2008, provisional application No. 61/038,777, filed on Mar. 24, 2008, provisional application No. 61/078,396, filed on Jul. 6, 2008.

(51) Int. Cl.
*G02B 6/26* (2006.01)
*H04J 14/00* (2006.01)

(52) U.S. Cl.
USPC .......... 385/17; 385/52; 385/53; 385/59; 385/134; 398/55; 398/56; 398/57; 398/106

(58) Field of Classification Search
USPC .......... 385/59, 53, 52, 134, 135, 76, 77, 385/78, 17; 398/50, 55, 56, 57, 106, 113
See application file for complete search history.

(56) References Cited

U.S. PATENT DOCUMENTS

| | | | |
|---|---|---|---|
| 6,243,510 B1 * | 6/2001 | Rauch | 385/15 |
| 7,555,189 B2 * | 6/2009 | Chen | 385/134 |
| 7,772,975 B2 * | 8/2010 | Downie et al. | 340/572.1 |
| 7,920,764 B2 * | 4/2011 | Kewitsch | 385/101 |
| 2008/0100456 A1 * | 5/2008 | Downie et al. | 340/572.8 |
| 2008/0193095 A1 * | 8/2008 | Chen | 385/135 |
| 2008/0273844 A1 * | 11/2008 | Kewitsch | 385/101 |
| 2009/0097797 A1 * | 4/2009 | Kewitsch | 385/17 |

* cited by examiner

*Primary Examiner* — Brian Healy
(74) *Attorney, Agent, or Firm* — Raymond Bogucki

(57) ABSTRACT

This invention discloses methods to reconfigure highly scalable and modular automated optical cross connect switch devices comprised of large numbers of densely packed fiber strands suspended within a common volume. In particular, methods enabling programmable interconnection of large numbers of optical fibers (100's-1000's) are provided, whereby a two-dimensional input array of fiber optic connections is mapped in an ordered and rule-based fashion into a one-dimensional array. A particular algorithmic implementation for a system reconfigured by a three-axis robotic gripper as well as lateral translation of each row in the input port array is disclosed.

20 Claims, 14 Drawing Sheets

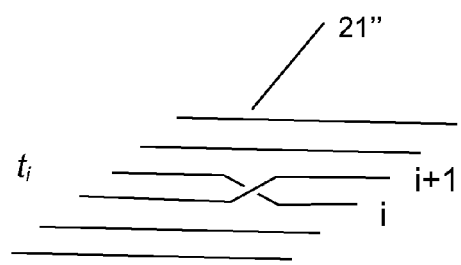
FIG. 3-A
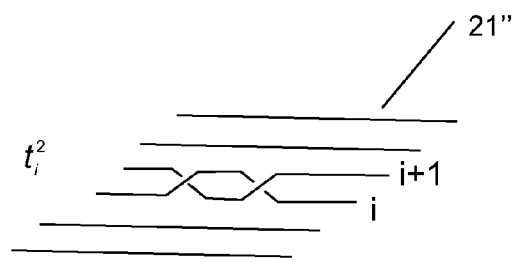
FIG. 3-B

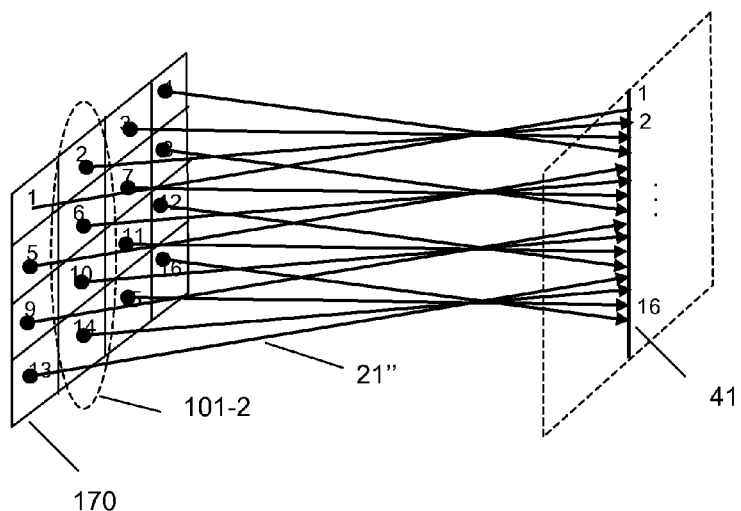
FIG. 4-A
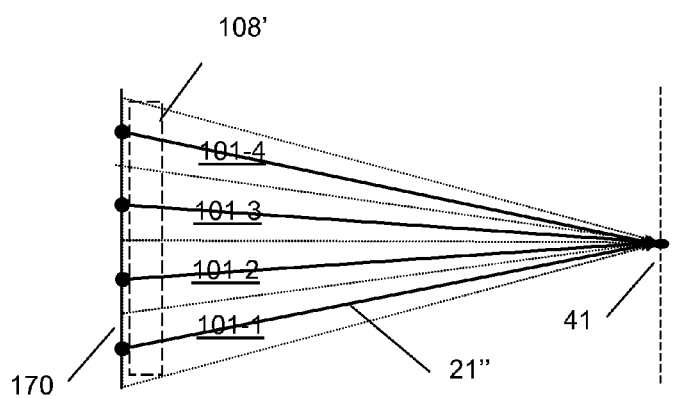
FIG. 4-B

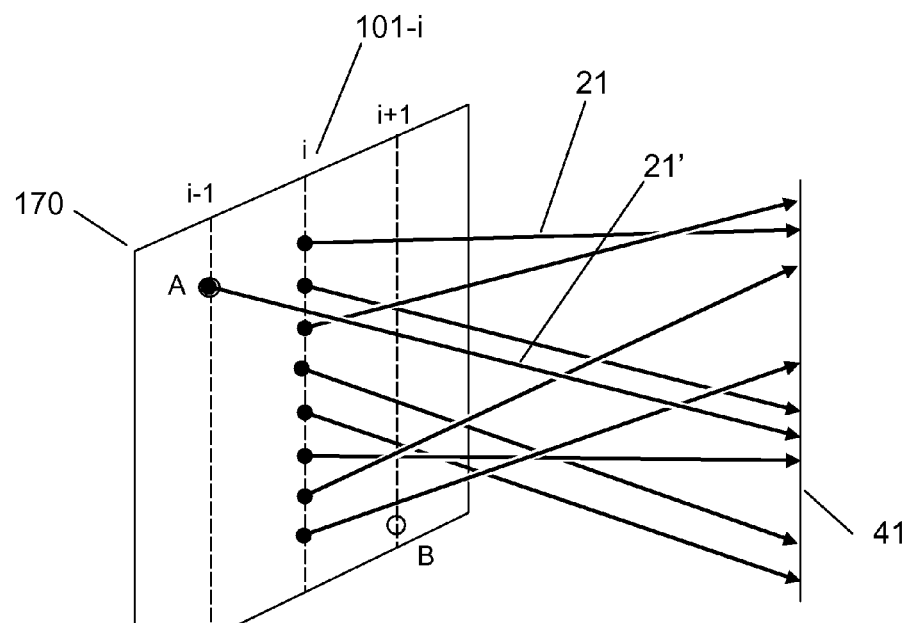
FIG. 6-A
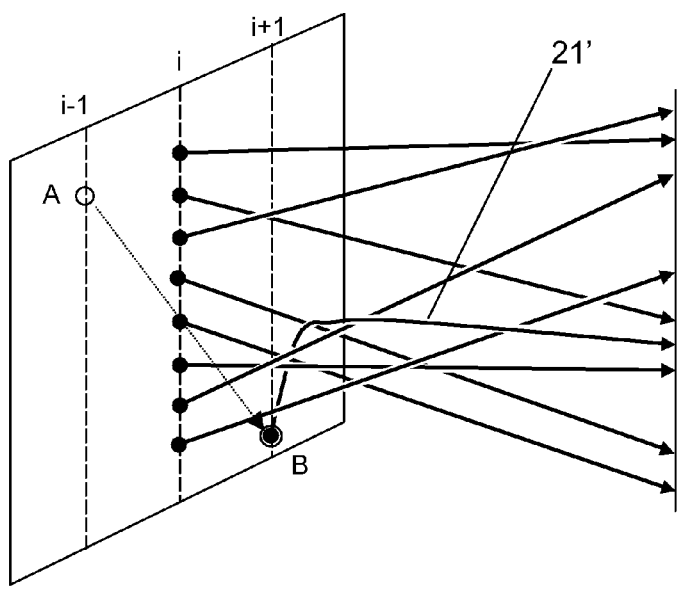
FIG. 6-B

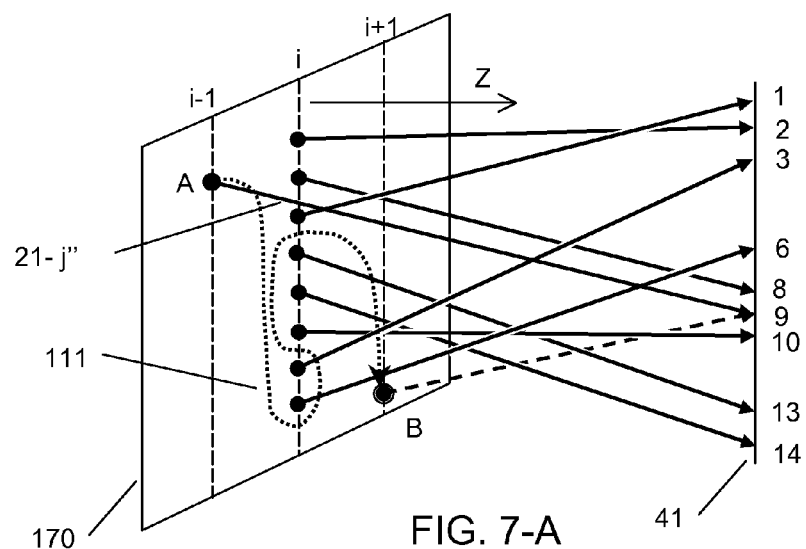
FIG. 7-A
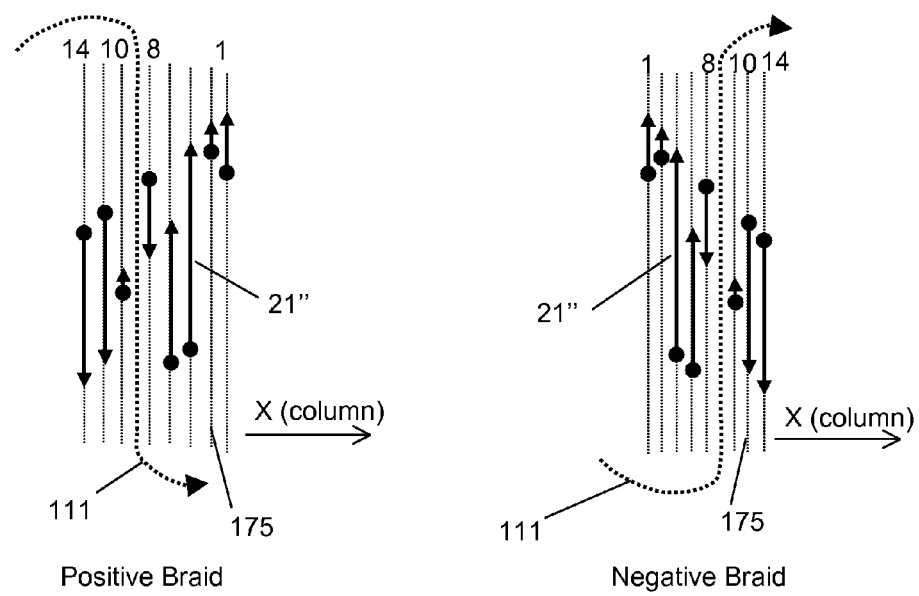
Positive Braid  
FIG. 7-B
Negative Braid  
FIG. 7-C

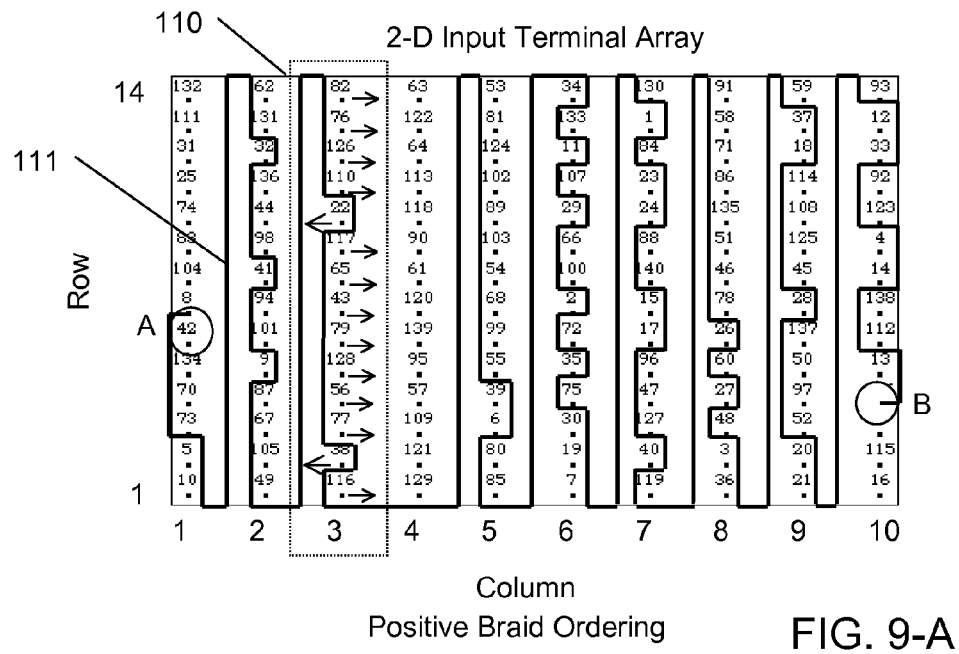
FIG. 9-A
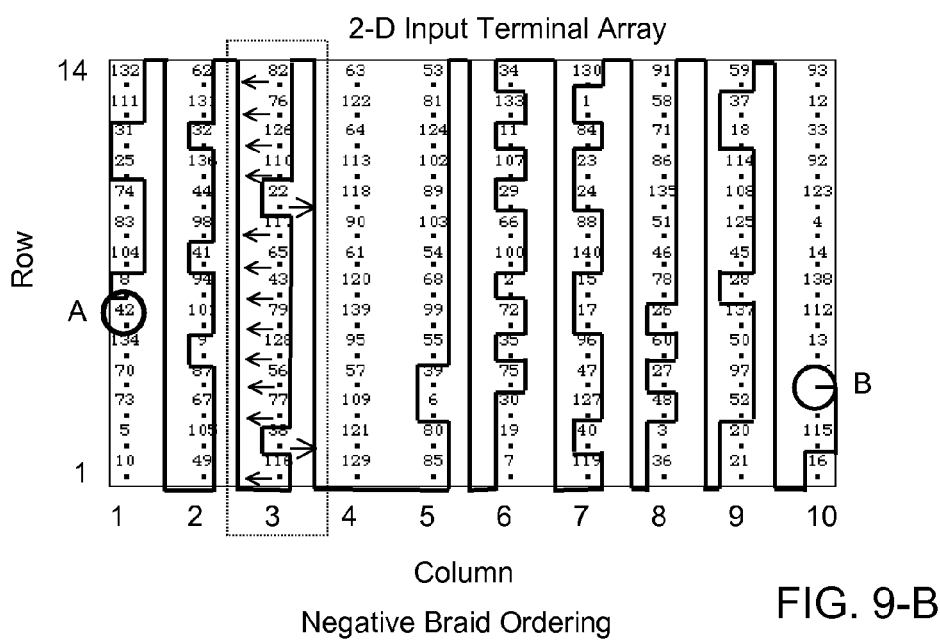
FIG. 9-B

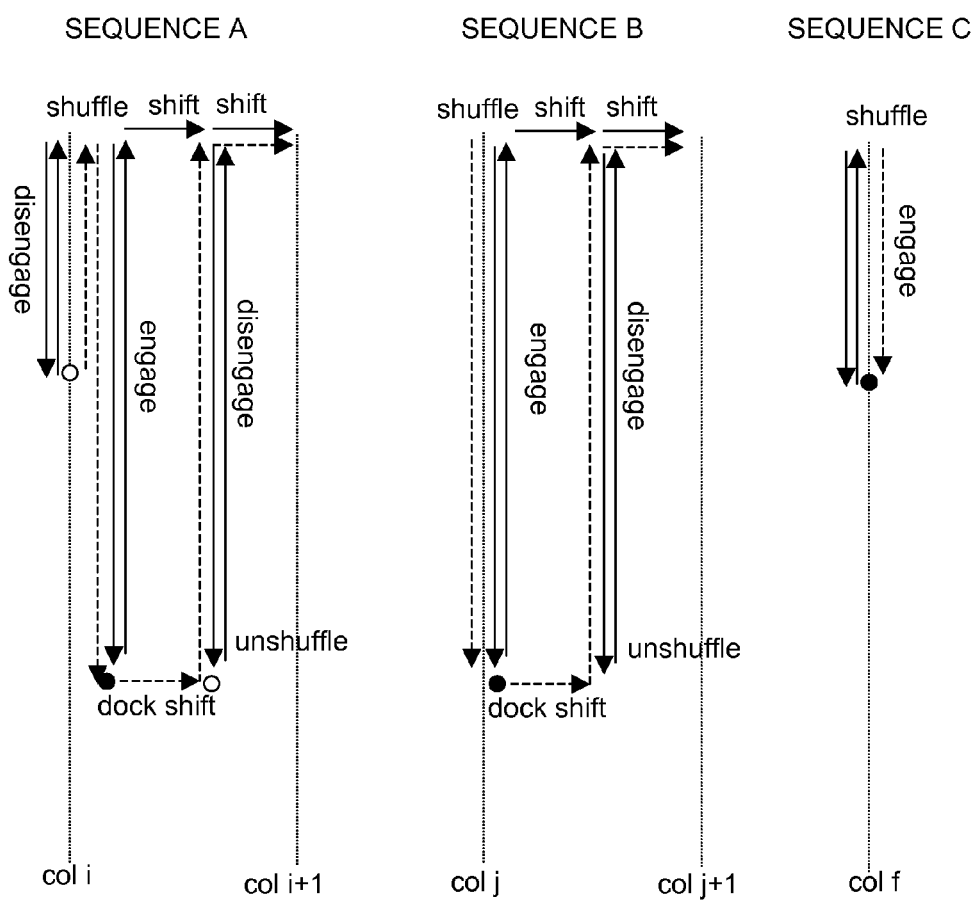
FIG. 10
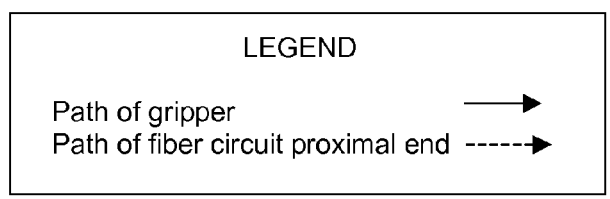

METHODS TO RECONFIGURE ALL-FIBER OPTICAL CROSS-CONNECTS

REFERENCE TO RELATED APPLICATIONS

This application is based on provisional patent application 60/980,148 filed on Oct. 15, 2007 and entitled "Fiber Optic Cross Connect Switch Using Flexible, Planar Fiber Optic Circuits", provisional patent application 60/987,414 filed on Nov. 13, 2007 and entitled "Fiber Optic Cross Connect Switch Using Layered Fiber Optic Circuits", provisional patent application 61/016,794 filed on Dec. 26, 2007 and entitled "Automated Fiber Optic Patch-Panels Using Flexible Fiber Optic Circuits", provisional patent application 61/018,668 filed on Jan. 2, 2008 and entitled "Large Scale Optical Cross-Connect Switch", provisional patent application 61/038,777 filed on Mar. 24, 2008 and entitled "Scalable and Modular Automated Fiber Optic Cross-Connect" and provisional patent application 61/078,396 filed on Jul. 6, 2008 and entitled "Methods to Reconfigure All-Fiber Optical Cross-Connects".

This application is filed concurrently with application Ser. No. 12/196,262, pending, filed on Oct. 31, 20011 and entitled "Scalable and Modular Automated Fiber Optic Cross-Connect Systems", directed to the systems employing this method.

FIELD OF THE INVENTION

This invention relates to methods for reconfiguring fiber optic cross-connect systems, and more particularly, to algorithms to reconfigure flexible fiber circuits within a volume shared by large numbers of adjacent and intermixed fiber circuits.

BACKGROUND OF THE INVENTION

Fiber optic patch-panels are used to terminate large numbers of optical fibers at an array of connectors mounted on modular plates, thereby providing a location to manually interconnect patch cords for their routing to adjacent circuits. Splice trays within the panel retain slack fiber and the splices joining connector pigtails to the individual fiber elements originating from one or more cables. Typical patch-panel systems interconnect 100 to 10,000 fibers. Connection to various types of transmission equipment, such as transceivers, amplifiers, switches and to outside plant cables destined for other exchanges, local offices, central offices, optical line terminations and points-of-presence are configured manually at the patch-panel.

As the reach of fiber optic systems extends to FTTH (Fiber-to-the-Home), access and enterprise networks, the locations of patch-panels are becoming geographically more dispersed and the sheer numbers of ports are increasing dramatically. Consequently, the tasks of allocating, reconfiguring and testing a fiber circuit within the network is challenging because of the potential for errors or damage resulting from manual intervention. Remotely reconfigurable patch-panels reduce the operational and maintenance costs of the network, improve the delivery of new services to customers and leverage costly test and diagnostic equipment by switching or sharing it across the entire network. Therefore, it is appealing from a cost, accuracy and response-time perspective to configure the patch-panel from a remote network management center. The key building block of an automated patch-panel system is a scalable, high port count, all-optical cross-connect switch.

A wide range of technologies has been developed to provide optical cross-connect functionality with several hundred ports. These include arrays of steerable micro-electromechanical (MEMS) mirrors to deflect beams, piezoelectric steerable collimators that direct free space beams between any pair of fibers, and complex robotic cross-connects utilizing actuators that reconfigure fiber optic connections. For the purpose of comparison we shall categorize the first two approaches as "non-robotic" and the latter approach as "robotic".

Non-robotic cross-connect switches, while offering the potential for relatively high speed (10 ms), do so at the expense of limited optical performance and scalability. The coupling of light into and out-of fiber and free-space introduces substantial alignment complexity and significantly increases insertion loss, back reflection and crosstalk. These approaches also require power to maintain active alignment and introduce micro-modulation of the transmitted signal as a result of the need to actively maintain mirror alignment. As a consequence, MEMS switches do not provide an optically transparent, plug-and-play replacement for manual fiber optic patch-panels.

Robotic cross-connect approaches perform substantially better from the standpoint of optical performance and their ability to maintain signal transmission even in the absence of power. However, the scalability of such approaches has been limited. The footprint of prior art robotic switch designs scales as $N^2$, where N is the number of circuits. The size of the switch matrix is typically N columns by N rows wide with $N^2$ possible interconnection points. Considering that the central offices of today's telecommunications service providers already utilize 1000 to 10,000 port patch panels, scalability is of prime importance. Therefore, an approach scaling linearly in N would enable the cross-connect to achieve a substantially higher port density commensurate with manual patch-panels.

Moreover, typical network installations are performed in an incremental fashion, whereby fiber circuits are added to the system as needed. Robotic and non-robotic approaches have not been modular and as such, they do not offer an upgrade path from 200 ports to 1000 ports, for example. To achieve port counts above several hundred, a three-stage Clos network interconnection scheme must be implemented [C. Clos, "A study of non-blocking switching networks" Bell System Technical Journal 32 (5) pp. 406-424 (1953)], leading to a substantial increase in cost, complexity and a reduction in optical performance by virtue of the need to transmit through a series arrangement of three rather than one switch element.

In addition, the optical performance of robotic cross-connects, while improving on non-robotic approaches, is still inferior to manual patch-panels because they introduce an additional fiber optic connection in series with each fiber circuit. A manual patch-panel requires only one connector per circuit and offers a typical loss of <0.25 dB, while the equivalent robotic patch-panel incorporates at least two connectors per circuit. This increases the loss by a factor of 2.

Furthermore, robotic approaches have required significant numbers of precision, miniature translation stages (2N) and at least 4 precision robotic actuators to align large numbers of input and output fiber end faces to one another. These fiber end faces physically contact one another and can exhibit wear-out for switch cycles in excess of 1000, or can become damaged at the high optical power levels transmitted through fiber in Raman amplified systems. The performance of frequently reconfigured test ports is therefore susceptible to degradation.

The prior art describes various mechanical approaches to interconnecting a number of fibers. U.S. Pat. No. 5,699,463 by Yang et al. discloses a mechanical optical switch for coupling 1 input into N outputs by translating an input fiber and lens to align to a particular output fiber. For patch-panel applications, the required number of input and output ports are near-symmetrical and equal to N.

A series of patents by Lucent, NTT and Sumitomo disclose various implementations of large port count optical cross-connects in which fiber optic connections are reconfigured by a robotic fiber handler. For example, Goossen describes a switch utilizing a circular fiber bundle and a circular ferrule loader ring in U.S. Pat. No. 6,307,983. Also, U.S. Pat. No. 5,613,021, entitled "Optical Fiber Switching Device Having One Of A Robot Mechanism And An Optical Fiber Length Adjustment Unit" by Saito et al., describes the use of a robotic fiber handler to mechanically reconfigure connectors on a coupling board. U.S. Pat. No. 5,784,515, entitled "Optical Fiber Cross Connection Apparatus and Method" by Tamaru et al. describes a switch in which connectorized optical fibers are exchanged between an "arrangement board" and a "connection board" by a mechanized fiber handler. A motorized means of fiber payout is further described. Related approaches are described in a series of patents including JP7333530, JP2003139967, JP2005346003, JP11142674, JP11142674, JP10051815 and JP7104201.

To overcome the prior art's susceptibility to fiber entanglement, Sjolinder describes an approach to independently translate fiber connectors along separate, linear paths in two spaced-apart planes on opposite sides of an honeycomb interface plate ["Mechanical Optical Fibre Cross Connect" (Proc. Photon. Switching, PFA4, Salt Lake City, Utah, March 1995]. In the first active switch plane, N linearly translating connectors are driven along spaced-apart rows by actuators and in the second active switch plane, an additional N linearly translating connectors are driven along spaced-apart columns. Row and column actuators are configured perpendicular to one another. Connections are made between fiber pairs located in any row and in any column by mating connectors at any of the $N^2$ common insertion points within the interface plate. This approach requires at least 2N actuators to arbitrarily connect N inputs with N outputs.

An extension of this cross-connect approach is disclosed in U.S. Pat. No. 6,859,575 by Arol et al., U.S. Pat. No. 6,961,486 by Lemoff et al. and WO2006054279A1 by J. Arol et al. They describe robotic cross-connect switches comprised of N input optical fibers supported by N translation stages and M output fibers supported by M translation stages. Each input fiber requires a shared or dedicated mechanical actuator to linearly translate both parallel to (x,y) and perpendicular to (z) the switch active planes. The connectors require individual z translation to physically contact the opposing facets of aligned input and output fibers.

The robotic cross-connect approaches described in the prior art have limited scalability and optical performance. The application of robotic optical switches to fiber optic patch panels demands true optical transparency, scalability to port counts in excess of 1000 within the footprint of a manual patch panel and modularity and the ability to incrementally add circuits on an as-needed basis.

SUMMARY OF THE INVENTION

Methods in accordance with the invention reposition fiber optic lines between the discrete elements in a first array that is two-dimensional in character and spaced apart collection lines in a linear array in a second plane parallel to the first. The method maintains an updated inventory of the interconnections and utilizes the lookup of this inventory to direct a positioner for engaging and disengaging fiber optic connections from the first array through columnar interstices between the connector elements in the first array. In response to a command to locate and move a selected line engaged in the first array, the positioner is driven along the interstices between columns and across rows to the selected location. Then under deterministic operating rules consistent with the known arrangement of interconnection vectors, the positioner and line are moved along the columnar interstices from one column to another until the target location is reached. A particularly advantageous method in accordance with the invention temporarily stores the connectors out of the path of the existing vector inventory. Further the rows of connectors are shifted incrementally in timed relation to the columnar motions. Thus the line being repositioned in vicinity of the first plane can be interwoven above existing lines whose vectors terminate at lower elevations at the second plane, and below existing lines whose vectors terminate at higher elevations at the second plane. Methods are further disclosed to augment the reconfiguration process with health monitoring processes such as optical power detection and electrical continuity detection to achieve high reliability operation.

BRIEF DESCRIPTION OF THE DRAWINGS

In accordance with the invention, the system and elements comprising the optical cross-connect switch and their various combinations are described in reference to the following drawings.

FIG. 3 is a diagram of a braid generator representing a crossing point (A) and a knot (B) between fiber strands;

FIG. 4 illustrates an arrangement of strands suspended between a reconfigurable 2-D array of terminals to a fixed 1-D array of ports, in perspective view (A) and top view (B);

FIGS. 6-A and 6-B illustrate entanglement considerations during switch reconfiguration;

FIG. 7-A illustrates a perspective view of the interconnect volume showing an example trajectory to reconfigure a strand without entanglement and FIGS. 7-B and 7-C illustrate braid ordering conventions for circuits within column i;

FIG. 9 illustrates an example of the reconfiguration trajectory in moving a strand proximal end interconnect from port A to port B for (A) positive and (B) negative braid ordering;

FIG. 10 is a diagram of the motion sequence to move the proximal end of fiber strand to increasing column number;

DETAILED DESCRIPTION OF THE INVENTION

Figure 1:
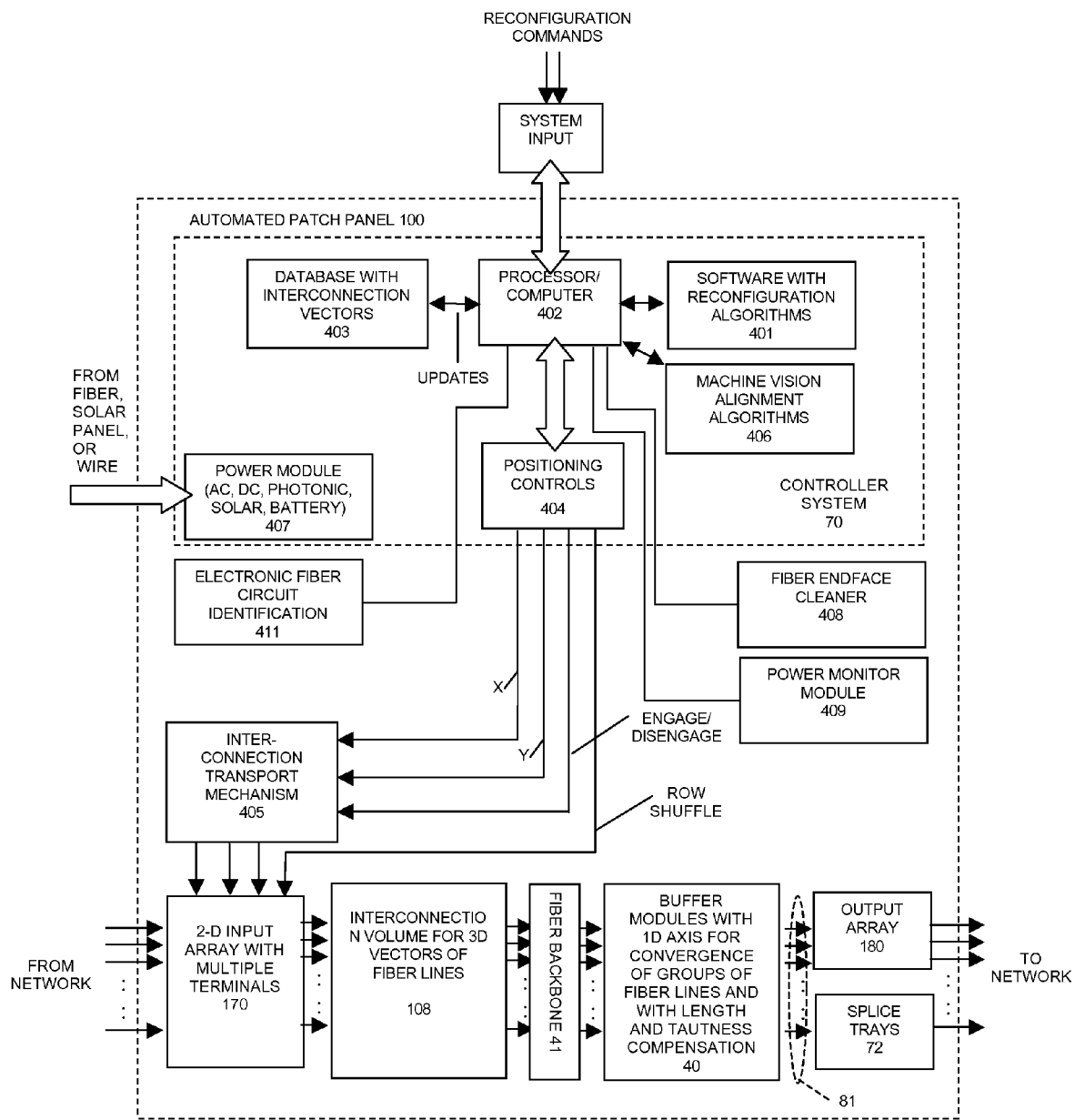
FIG. 1 is a block diagram of the fiber optic cross-connect system in accordance with the invention.
Figure 2:
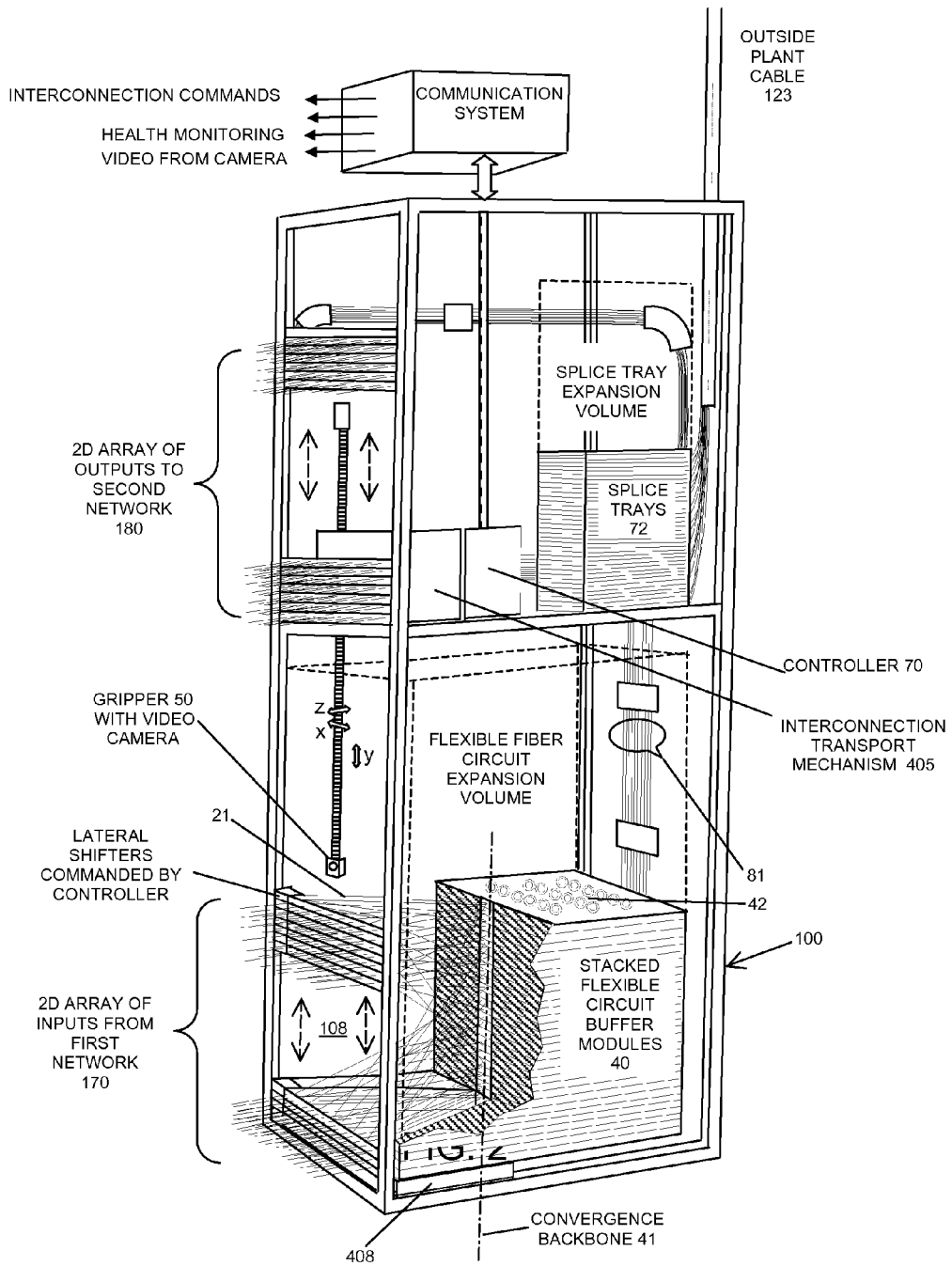
FIG. 2 is a perspective, partial cutaway view of the optical cross-connect switch.

In this invention, we disclose methods to reconfigure all-fiber cross-connect switching systems such as those illustrated in block diagram view in FIG. 1 and in partial cutaway, perspective view in FIG. 2. These systems are comprised of 100's to 1000's of fiber interconnects suspended between two planes and intermixing within a common volume. Reconfigurable fiber connections are made internal to this volume, between a two-dimensional array of reconfigurable input terminals 170 and an intermediate, substantially one-dimensional array 41 bounding the interconnect volume 108. The suspended fiber lines 21 therebetween follow substantially straight-line paths and define a three-dimensional arrangement of vectors directed towards the one-dimensional array 41 located at an intermediate plane, beyond which the fiber lines 21 exit contiguously to a modular arrangement of substantially identical, stacked buffer elements 40. Buffer elements provide slight tensioning, parallel to vectors and adequate to maintain taut fiber lines in addition to retaining excess slack in the fiber lines. The tension force produced by buffer modules 40 on each fiber line lies substantially parallel to the vector defining the three dimensional orientation of each fiber line.

Physically non-blocking, automated and software-driven reconfiguration in a volume which scales as N, the number of fiber ports, is accomplished by linking the two-dimensional array of input terminals 170 with taut flexible fiber optic circuits 21 spanning the switch's cross-connect volume 108 and extending from a one-dimensional array of ports at the intermediate optical switch backbone, 41. Contiguous fiber lines 21 pass through ordered guides at backbone 41 to self-tensioning and slack retention means within stacked and modular circuits 40.

This cross-connect system 100 is comprised of a combination of independent and separable modules to provide desirable characteristics of modularity, scalability and customization. This includes a multiplicity of stacked flexible fiber optic circuit modules 40, an interconnection transport mechanism 405, gripper 50, controller 70, optical power detection module 409, electronic fiber identification module 411, power module 407, and optionally a fiber end-face cleaner module 408. A typical optical cross-connect system in accordance with this example occupies a 7-foot tall, 19 or 23-inch wide rack with in excess of 1000 by 1000 ports. Switch terminals 170 can be added in fixed increments ranging between 12 to 36 (depending on the number of ports per row) by installing additional flexible circuit modules 40 above those previously installed modules in the flexible fiber circuit expansion volume. The output fibers 81 from modules 40 may be spliced to one or more multi-fiber cables 123 and arranged in splice trays 72, or terminated directly at the array of front panel terminals 180.

In the particular example of FIG. 2, the lower section of the switch volume is substantially comprised of the reconfiguration volume 108 and the upper section includes a combination of fiber splice trays 72 as well as fibers terminated in an array 180 of connectors. In general, the reconfiguration volume 108 may lie at the top, bottom, side or central section of the system. A central portion of the upper section is clear of obstructions to enable the robotic actuator to move, extend and park within this section while being unencumbered by fibers or other elements. The bottom-most section beneath the input terminal array 170 includes a row of translatable docking ports and a fixed row of docking ports to facilitate exchange of fiber lines 21 between the terminals. The polished fiber end-face of a connector can be cleaned prior to insertion at terminal array 170 by use of an integrated fiber end-face cleaning module 408, comprising a fiber cleaning fabric ribbon in spooled form and a motorized drive unit which automatically moves the fabric relative to the end-face, thereby cleaning the fiber end-faces in a non-wearing fashion.

A multi-functional gripper 50 transported by the interconnection transport mechanism 405 is utilized for transporting a fiber line to a different location in terminal array 170. Any of the fiber circuits 21 are arbitrarily reconfigurable by engaging a selected circuit with this programmably moveable gripper 50 to reposition connectorized fiber optic circuits 21 within interstitial regions at the interior surface of the array of switch terminals 170. Non-interfering reconfiguration is accomplished by following a non-blocking path computed by the switch control system 70 and based on knowledge of the configuration of all intermediate lines 21 intermixed within the common interconnect volume 108.

Such a gripper may further include functionality such as machine vision alignment and inspection, electrical monitoring and power monitoring. The gripper is attached to the end of the y axis linear actuator and includes a mini-camera and light source to capture and relay video data to processor 70 for active alignment of gripper relative to a terminal of input array. For example, this video data is processed in real time by pattern matching algorithms residing in the processor system to determine the center of mass of indicia associated with each connector terminal on located on the interior side of the front panel. This process is utilized to align the gripper in x and y with a selected fiber strand connector on a frame-by-frame basis utilizing closed-loop feedback to the motors driving the x and y motion.

This gripper 50 can utilize a latching, spring clip mechanism to engage a connector and concurrently make electrical contact with a conductive element running along the length of the suspended fiber circuit 21. The gripper is connected to electrical ground, for example, so that when a fiber circuit is attached to gripper, an electrical circuit between the fiber circuit and a continuity test circuit is completed and used to trigger subsequent moves. The connector body may be held within a formed or stamped-metal retaining clip, the clip including locking features to rigidly hold connector, engagement feature(s) to attach within gripper, and conductive features to make electrical contact with connector. Before disconnecting a fiber circuit from its mating receptacle, electrical continuity should be confirmed to ensure the circuit 21 is properly seated and engaged within the gripper 50.

In an additional embodiment, the optical power transmitted through any particular optical fiber may be monitored by use of a shared, non-invasive optical power monitor head integrated within the end of the gripper 50. For example, when the optical power monitor head produces a micro-bend in a fiber circuit, a small amount of light is coupled out of fiber onto a photodiode element within the power monitor head. Prior to disconnecting and reconfiguring a particular optical fiber, the optical power can be measured non-invasively within this fiber to confirm that it is not carrying live traffic, i.e., it is a dark fiber. This prevents potential disruption of service due to an erroneous switching instruction.

A method of arbitrarily reconfiguring of any fiber line within this multiplicity of surrounding fiber lines cannot be practically implemented except under the guidance of computer control. Therefore, unique reconfiguration methods are disclosed herein, based on translating the origin of the vector associated with a fiber line through the region of interconnect volume 108 immediately adjacent to the two dimensional array of terminals 170 in a sequential, column-by-column fashion. This moving vector weaves through the surrounding space of vectors in a non-interfering fashion. Such translation across, up and down columns is achieved by use of the interconnection transport mechanism 405 whose positioning is directed by electronic positioning controls 404 that respond to commands generated by a processor 402. The processor executes multiple processes including the calculation of reconfiguration algorithms 401, machine vision alignment 406, optical power detection 409, electrical fiber identification 411, fiber end-face cleaning 408 and updating of the database of interconnections 403. The sequence of steps to affect reconfiguration are of sufficiently high complexity to be impractical to perform without the direction of controller 70.

Reconfiguration of flexible, yet taut fiber lines is made internal to interconnect volume 108 by disengaging, translating and re-engaging fiber line connectors adjacent the internal surface of the two-dimensional input array 170 of terminals under the control of the interconnection transport mechanism 405. The interconnect volume is bounded on the input side by the array of terminals 170 and on the opposite side by a substantially one-dimensional array of fiber through-ports forming a fiber backbone 41 lying at an intermediate plane within the cross-connect system.

The fiber strand interconnection volume utilized herein lies between two planes spaced apart by a distance L. The first plane coincides with an input terminal array 170 and the second plane coincides with the convergence backbone 41. The internal connections made to the input terminal array are reconfigurable. The input terminals generally include reconfigurable connectors which mechanically and optically latch within mating connector receptacles, and the intermediate ports consist of an array of flexible fiber guides through which the fiber lines pass under tension. Each row of connectors on the lower input array illustrated in FIG. 2 can independently shift laterally under the command of controller 70. Such row shifting enables the implementation of unique reconfiguration algorithms based on coordinated motion of the gripper 50 and the row translations to "weave" a non-repeating braid arrangement of fiber strands. Reconfiguration is initiated by a user or external software client by entering simple reconfiguration commands as the system input. The controller system 70 processes these commands, based on the current state of the database of interconnection vectors 400, to compute the required multi-step reconfiguration process. Thereafter, the motion of interconnection transport mechanism 405, including a multifunctional gripper 50 to engage and move the particular fiber line, is synchronized with programmed, independent translation of each row comprising the two dimensional array of terminals 170 along the x axis, enabling vectors to be reconfigured such that fiber lines retain substantially straight-line paths for any number of arbitrary reconfigurations. The vector undergoing reconfiguration maintains a proper orientation relative to surrounding vectors such that entanglement is avoided at all times and for all potential reconfigurations.

Reconfiguration Algorithms

The development of suitable reconfiguration algorithms is based on the spatial relationships between an intermixed arrangement of physical interconnects, which is effectively represented by the Theory of Knots and Braids. The group of fiber interconnections are described by a Braid Group, with an associated algebra well suited to represent the various geometrical relationships between interconnect strands comprising the braid.

Each fiber interconnect or circuit suspended between the input and intermediate planes is mathematically equivalent to a strand or vector joining two points in opposite planes. The cross-connect switch volume is comprised of large numbers of strands whose geometric relationships are changing as a result of reconfiguration. To avoid knotting of these strands, their crossing characteristics in relation to other strands must be recorded. The reconfiguration algorithms disclosed in this invention take one end of a particular strand at the input plane and maneuver its endpoint such that the strand passes through the interconnect volume without entangling other strands.

The first step is to represent the set of N switch interconnections characterizing a particular switch state by an N-stranded braid. The braid generator $t_i$ is defined over the braid group and represents the physical crossing of a strand at position i over a strand at position i+1 (FIG. 3-A). For example, a braid group of n strands 21" may be denoted by $B_n = (t_1, \ldots t_n)$. A particular braid element of this group is described by a product of $t_i$'s, where the terms in the product are ordered from right to left to correspond to crossings arranged from right to left along each strand 21". The subscript i refers not to a physical strand but to position within the braid.

Based on the properties of braid groups, two crossings commute only if they do not operate on the same strand. That is, $t_i t_j = t_j t_i$ if $|i-j| > 1$. Therefore, the usual notion of commutativity under multiplication does not apply to the braid generator. A knot occurs when one strand fully wraps around another and is represented by a generator $t_j^2$ (FIG. 3-B). One strand simply passing over another (represented by $t_i$) does not represent a knot, because strands can be thought of as lying in different layers, one layer on top of another. In general, a strand including the generator $t_i^x$, where x>1, would exhibit a knot.

It is a requirement of all-fiber cross-connect systems that interconnections remain knot-free. Such interconnections correspond to braids comprised of strands with $|x| <= 1$ and are conventionally called positive (x>0) or negative (x<0) non-repeating braids (positive if the braid only has positive crossings, that is, the front strands have a positive slope). To prevent physical entanglement within the switch interconnect volume, it is necessary that each strand be described by generators $t_i^x$ with $|x| <= 1$ throughout the operational lifetime of the switch. An example of a negative, non-repeating braid is given by $(t_1^{-1} t_2^{-1} \ldots t_{16}^{-1})(t_1^{-1} t_2^{-1} \ldots t_{15}^{-1}) \ldots (t_1^{-1} t_2^{-1}) t_1^{-1}$ and illustrated in FIG. 4. While this braid includes the product of a number of generators $t_i^{-1}$ on the same strand position i, it does not include $t_i^x$ with $|x| > 1$ because of non-commutativity. Therefore, each strand 21" can be thought of as residing in its own layer, which can be individually peeled away from other layers.

A fiber optic connection at the front input terminal array is reconfigured by physically translating its proximal endpoint within the interstitial regions 108' between the arrayed interconnections of the input terminals. This endpoint should remain close to the plane of the input array because interstitial gaps between interconnects exist here and they allow physical access for the gripper 50, for example, to reconfigure endpoints. On the other hand, the interconnects' distal endpoints extend through the intermediate array 41 and their configurations remain fixed. There is generally not an unobstructed path for the gripper to move from the input array 170 to the intermediate array 41 through the intervening interconnect volume 108, so all reconfiguration is performed in proximity to the input array.

Fiber interconnects represented by an N-stranded braid can realize an infinite number of configurations. If the interconnect paths 21" are spatially indeterminate, as would be the case when the length of the strand is greater than the straight-line path, the knotting of strands is possible. Least-path, variable length interconnects must be maintained to prevent knotting. To manage these excess fiber lengths, a tensioning and storage volume 138 is provided, located opposite the intermediate plane 41 and adjacent to the strand volume 108. Each interconnect state is then comprised of only straight-line strands 21″ joining the input 170 and intermediate 41 arrays. We can assume the fiber interconnections have infinitesimal thicknesses so that deviations from linear paths at potential crossing points have a negligible effect on the interconnection trajectory. Mathematically, this set of interconnections belongs to the group of positive (or negative) non-repeating braids. The sign of the braids is dictated by an initial ordering convention, which must be maintained during all subsequent reconfigurations. For positive braids, the strand i passes over the strand i+1 when viewed from the side, as in FIG. 3-A.

Since each interconnect follows a straight-line path, there is a deterministic algorithm to move the endpoint of one strand through the interconnect volume to a new state, such that the strand and all others trace straight-line paths in the final state.

The geometric "order" of strands within the interconnect volume is increased by interconnecting the 2-D input array of terminals to a 1-D intermediate array of ports. By "order" we refer to the partitioning of the switch volume into smaller regions, columnar zones or "subbraids" that are physically independent of one another. Arbitrary interconnections are reconfigured by crossing through each independent, orthogonal zone in a sequential fashion until the destination zone is reached. For this geometry, straight-line interconnections are maintained even during reconfiguration. The input array consists of a columns by b rows and the intermediate array consists of n=a·b rows.

For example, the interconnect strands between a 4×4 input terminal array 170 and a 16×1 port intermediate port array 41 is shown in FIGS. 4-A and 4-B. The strands 21″ follow straight-lines between the input terminals and intermediate ports. The mapping of the 2-D inputs to a 1-D array performs the mathematical equivalent of "combing" the interconnection braid and forming independent, spaced-apart subbraids. The interconnection geometry reduces to a deterministic arrangement that eliminates the potential for circuit interference by subdividing the braid into separate, independent subbraids or zones 101-1, 101-2, 101-3, 101-4 originating from each column of input terminals. That is, $B_n = (t_1, \ldots t_n)$ reduces to the subbraid group $B_a = (t_1, \ldots t_a)$, where a is the number of rows. The interconnections are inserted and maintained in the proper order such that each subbraid is non-repeating—any two of its strands cross at most once. The strands 21″ of the non-repeating braid are overlaid back to front without intertwining and effectively lie within separate layers, thus eliminating any tendency to tangle.

Strands do not span more than one zone for any final interconnect configuration. The algorithms to re-arrange any interconnect in a non-blocking fashion require knowledge of each interconnect's intermediate array row m and the sign of the braid. To move a strand n within column i to a column j, the subset of strands in column i lying between strand n and strand j must be identified, after which the proximal endpoint of this strand traces out a continuous path passing below the subset of strands with m>n and above the subset of strands with m<n.

The rules governing non-blocking circuit re-arrangement are as follows:

(1) Fiber circuits 21 must follow substantially straight-line paths between the two-dimensional input terminal array 170 and the one-dimensional port backbone 41.

(2) Fiber circuits 21 must span only one zone 101 for any particular configuration.

(3) Each fiber circuit must be associated with unique "address" relating to its elevation at the fiber backbone 41.

(4) A fiber circuit must be inserted or removed from a column only in an ordered fashion based on each circuit's "address" within fiber backbone. Circuits within a particular zone may be thought of as occupying separate "layers" within the zone along vertical planes joining the input column and the backplane. These layers are ordered sequentially based on the "address" of the fiber circuit within, in either a positive or negative ordering.

Figure 5:
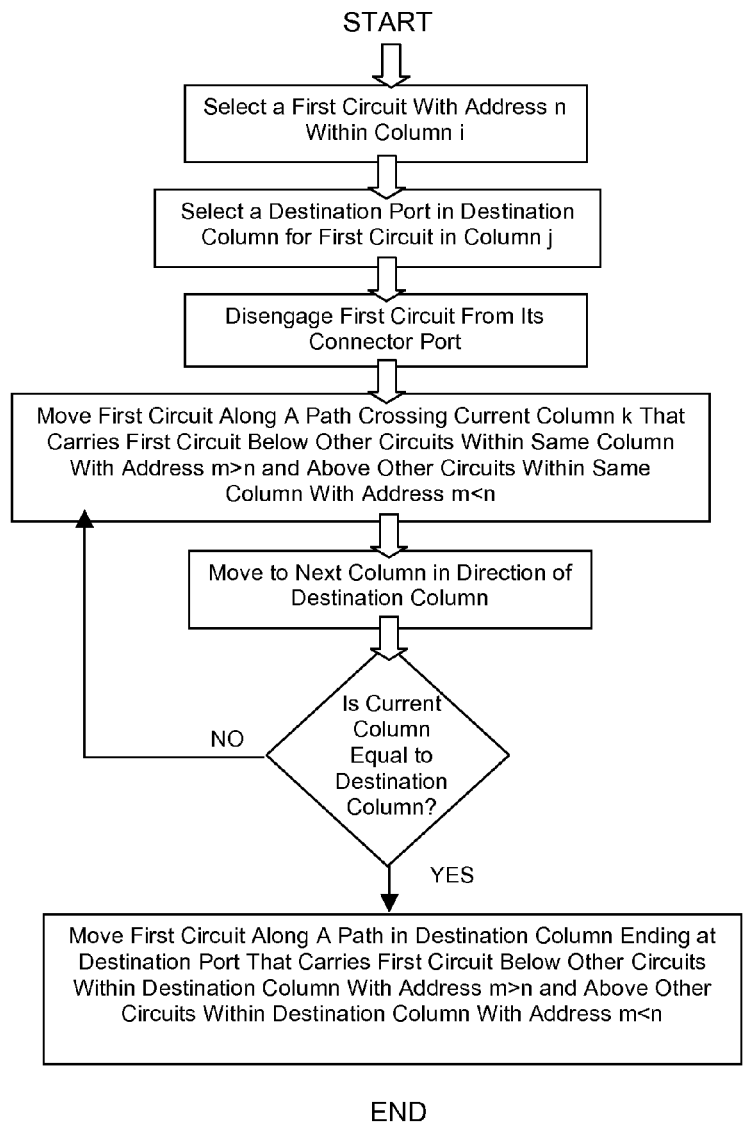
FIG. 5 is a flow chart illustrating the process to reconfigure strands in an ordered fashion.

The algorithm required to re-arrange any circuit in a non-blocking fashion is as follows: movement of a particular fiber circuit 21 across a column requires knowledge of each fiber circuit's "address" m and "order" (positive or negative). To move a circuit n within column i to a column j, the subset of circuits in column i that lie between circuit n and column j must be identified, then circuit n should move below the subset of fiber circuits with m>n and above the subset of fiber circuits with m<n on a column by column basis. FIG. 5 is a flow chart illustrating the sequence of steps to make arbitrary rearrangements of strands.

Reconfiguration of circuits laid out according to the geometry disclosed herein and following the rules outlined above can be achieved in a non-blocking and non-interfering fashion. Reconfiguration only requires knowledge of the particular interconnection braid at the time of reconfiguration and is independent of prior switch history. This rule-based algorithm remains valid for any number of switch reconfigurations.

For illustration by way of a simplified example, the reconfiguration of a circuit which must pass from subbraid i−1 to subbraid i+1 by traversing an intermediate subbraid i (101-*i*) in a manner which avoids knotting of circuits 21 is shown in FIG. 6-A. In the initial configuration, the circuit 21' undergoing reconfiguration is initially attached to terminal A within subbraid i−1, and is to be moved to terminal B within subbraid i+1 of input array 170 in a non-blocking fashion. If the circuit 21' is reconfigured by moving it from terminal A to terminal B along a straight-line path lying substantially in a plane parallel to 170, as shown in FIG. 6-B, the circuit 21' becomes physically entangled with the circuits of subbraid i. This entanglement will prevent subsequent reconfiguration through the knotted region. The proper path of circuit 21' to prevent physical entanglement is illustrated in FIG. 7-A, wherein the circuit 21' passes below those circuits 21 originating from a higher level at the switch backbone 41 and above those circuits originating from a lower level at the switch backbone.

In the particular example illustrated in FIG. 7-A, a strand passes from column i−1 to column i+1 by traversing an intermediate column i in a manner that avoids entanglement. If the strand were reconfigured by moving the end of strand i from a terminal A to a terminal B along a direct straight-line path in the plane parallel to input array, the strand 21-*j*″ would likely become physically entangled with other strands of subbraid i. Entanglement prevents subsequent reconfiguration through the knotted region. A proper path 111 of the strand endpoint is represented by the dotted line in FIG. 7-A, wherein the strand passes below those strands originating from a higher level at the switch backbone and above those strands originating from a lower level at the switch backbone.

Since the strands within any column have a non-repeating braid structure, they occupy their own layer 175 that can be individually peeled back from the others. FIGS. 7-B and 7-C illustrate end-on views of strands within the zone i. In this representation, the circuit j passes between these separate layers corresponding to strands 8 and 10. Such a path 111 does not cross nor entangle adjacent strands.

Placement of circuits within each subbraid column requires adherence to ordering conventions as in Rule IV above. FIGS. 7-B and 7-C illustrate two alternative implementations of the ordering rule, corresponding to positive and negative braids, respectively. These figures are not-to-scale and represent an exploded view down the z axis of a particular zone 101-$i$ in FIG. 7-A to reveal the ordering of circuits 21 therein. A positive braid (FIG. 7-B) and ordering rule requires that fiber circuits 21 be placed from left to right within each zone 101 with increasing addresses (or elevations) at the one dimensional backbone. A negative braid (FIG. 7-C) or ordering rule requires that fiber circuits 21 be placed from left to right within each zone 101 with decreasing addresses (or elevations) at the one dimensional backbone. The trajectories to reconfigure circuits for these two conventions are different. Non-entangling algorithms can be developed regardless of the sign of the braid, as long as it is either positive or negative non-repeating.

Figure 8:
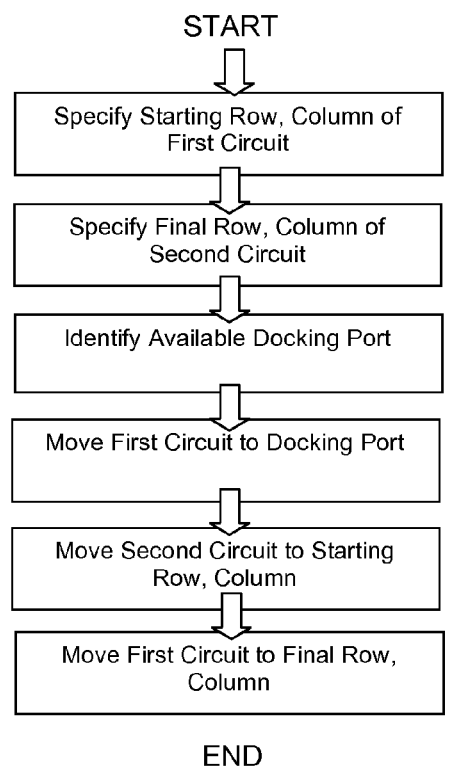
FIG. 8 is a flow chart illustrating the sequence of reconfigurations to exchange a pair of strands between two input ports.

Typically, the reconfiguration of strands within the cross-connect involves the swapping or exchange of two circuits located at two different terminals at the input array. To facilitate the exchange, docking ports are provided to temporarily hold the first strand, after which the second strand is moved to the original location of the first strand, and the first strand is moved from the docking port to the original location of the second strand. This process is depicted in block diagram form in FIG. 8 and consists of three primary subroutines. FIG. 9 for example, illustrates one particular subroutine of the reconfiguration process, whereby two circuits are exchanged between a pair of terminals.

FIG. 9-A illustrates an example terminal-map 110 and reconfiguration trajectory to move a circuit from a terminal A to a terminal B within the array of input terminals 170 in which the interconnections are ordered according to a positive braid. This terminal map 110 corresponds to a 10 column by 14-row array of terminals, wherein the numbers associated with each terminal correspond to the address of the particular circuit 21 attached thereto. Each fiber circuit 21 within the column originates from a different level of backbone 41 and is associated with an address used to determine the proper non-blocking trajectory for the circuit. In this particular example, each terminal has been randomly assigned a circuit.

A first fiber circuit at terminal A (col,row)=(1,6) is to be switched to port B (10,4). A second circuit presently at port B is moved to a docking port (not shown) to vacate port B. As shown in FIG. 9-A for a positive braid and FIG. 9-B for a negative braid, to move the first circuit from left to right across this array of ports, it must pass through each column or subbraid 101-1, . . . in a sequential fashion without entangling any potentially crisscrossing circuits within the columns.

To trace out a non-interfering path through the array of fiber circuits, the particular circuit A must follow a path across the columns of connectors and their attached fibers, whereby fiber circuit A passes below those optical circuit elements which originate from higher levels at the backbone and pass above those elements which originate from lower levels. The path represented by FIG. 9 represents the relative positions of the various circuits and is not to scale. The actual trajectory is dependent on the particular actuation approach.

In a particular embodiment of the invention utilizing independent translation of connector rows 46 along the x direction, the path shown in FIG. 9 is actually comprised of both gripper 50 motion and independent sliding of each connector row 46. The gripper 50 translates up and down columns in a straight-line path, with the rows 46 shifting transversely to ensure that the particular fiber circuit 21 moves to the left or right of other circuits within the column. In this example, the circuit moves according to a sequence of steps comprised of alternately descending into and ascending out of zones. The circuit must fully clear the first subbraid 101-1 before entering and weaving through the second subbraid 101-2. In the sense of FIG. 9, it should be appreciated that there is equivalence between moving above or below a circuit and moving to the left or right of the same circuit, respectively. The arrows in column 3 of FIG. 9 indicate the directions the rows must shuffle as the circuit A passes through and across this particular column.

The movable endpoint of circuit 21' is constrained to lie within a region substantially parallel to and in the vicinity of the plane of input terminal array 170. Within this region there exist open columnar volumes where the gripper 50 can extend without interfering or snaring surrounding fiber circuits.

Figure 11:
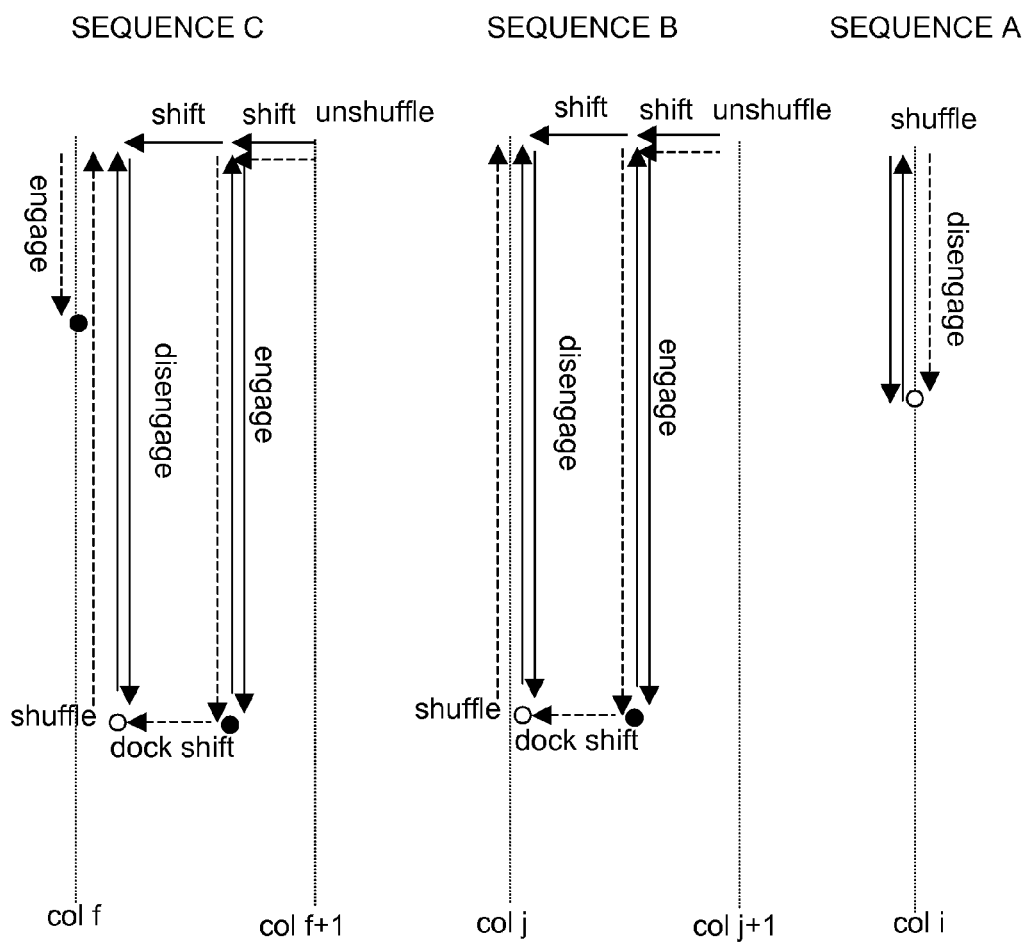
FIG. 11 is a diagram of the actuator and connector trajectories while moving a strand in a non-blocking fashion to decreasing column number.

The movable endpoint of circuit 21' is translated by a sequence of steps as illustrated in FIGS. 10 and 11. The dashed lines represent the path of this fiber endpoint and the solid lines represent the path of the gripper as it descends into the open columnar volumes. The reconfiguration of a circuit to a column on the right follows three sequences A, B and C, each comprised of several steps. Sequence A begins with shuffling the rows of a column in directions based on the addresses of fibers 21 at the convergence axis 41. The gripper then descends into the columnar zone opened during the shuffling process, effectively splitting the subbraid into two, and disengages the starting connector from its front panel receptacle. The connector attached to this circuit is disengaged from its initial port. The gripper then moves to the bottom of this column through the split subbraid to engage the connector into a bottom docking port. The gripper releases the connector at the docking port and returns to the top of the column. The docking port moves to the right, carrying the connector/circuit 21' with it, and the rows of the column "unshuffle", that is, they return to their center positions, in vertical alignment. The gripper next shifts by half a column spacing to the right and descends into the columnar zone formed by unshuffling, thereby disengaging the connector from the docking receptacle and carrying it to the top of the intercolumnar zone. The gripper with connector then shifts again to the right, moving to the top of column i+1.

This process is followed by sequence B. The rows are shuffled and the gripper descends down the column to engage the connector with the docking port. The gripper then returns to the top of this column and shifts over half a column spacing to the top of the intercolumnar zone. The rows unshuffle and the docking port translates to the right. The gripper then descends into the intercolumnar zone formed by unshuffling, to disengage the connector from the docking port and to carry it to the top of the intercolumnar zone. Next, the gripper shifts to the top of the next column. Sequence B is repeated until the connector reaches the final column, at which point it passes to sequence C. In sequence C, the rows shuffle and the gripper descends into the column to engage the connector into the final port in column f. Note that in this example, the braids have positive ordering and the connector enters the top of each column and exits the bottom of each column when moving to the right. This would be reversed for negative braid ordering, an equally valid convention. Note further that the distinction between positive and negative ordering is based on a somewhat arbitrary definition of the sense of the positive direction, so for a different definition, the conventions for positive and negative ordering would be exchanged.

A similar sequence of steps is followed to move the circuit to the left, as shown in FIG. 11. This example is also in accordance with positive braid ordering. Note that in this process the connector enters from the bottom of the column and exits from the top of the column as it moves to the left.

Figure 12A:
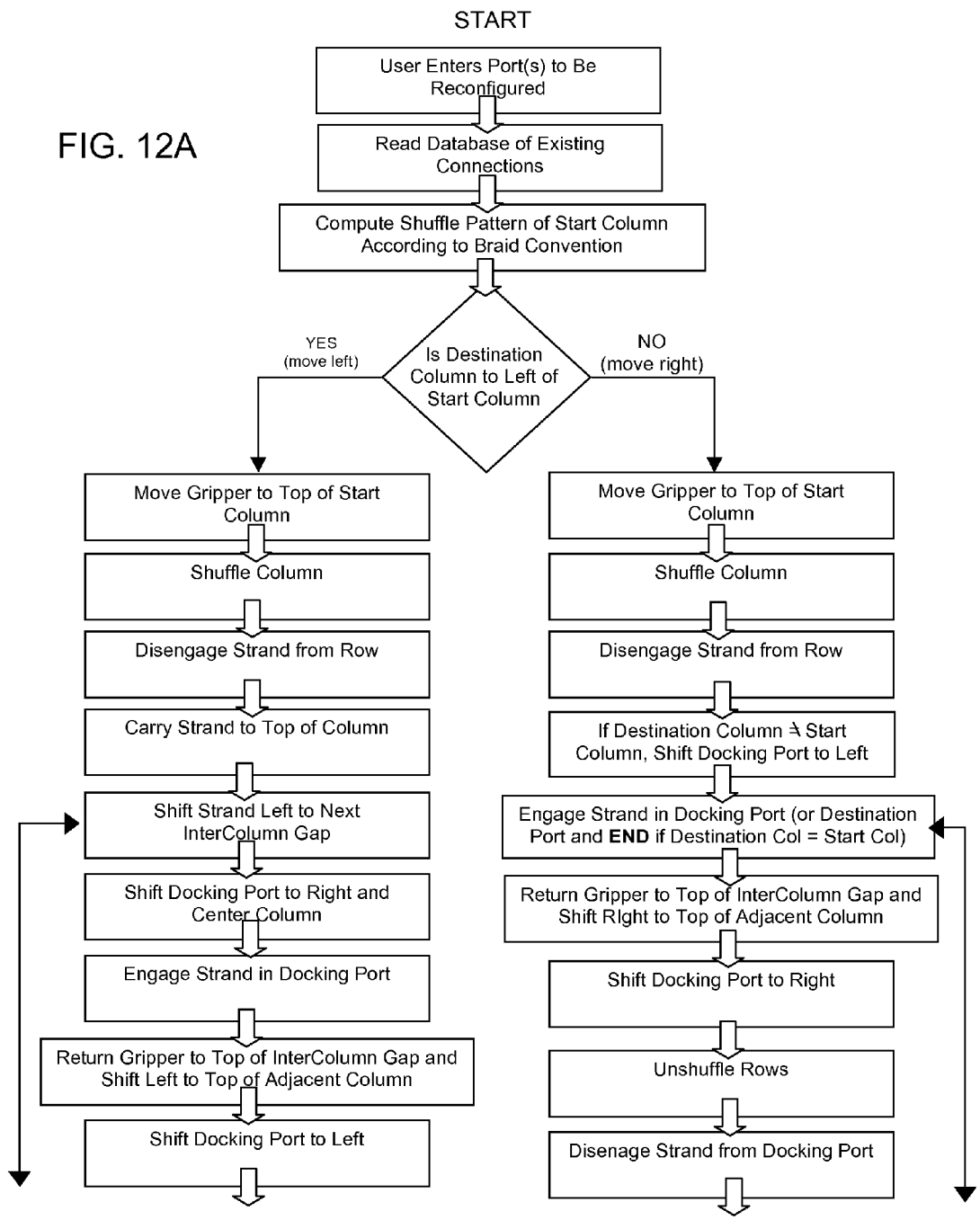
FIGS. 12A and 12B illustrate a flow chart of the strand reconfiguration process.
Figure 12B:
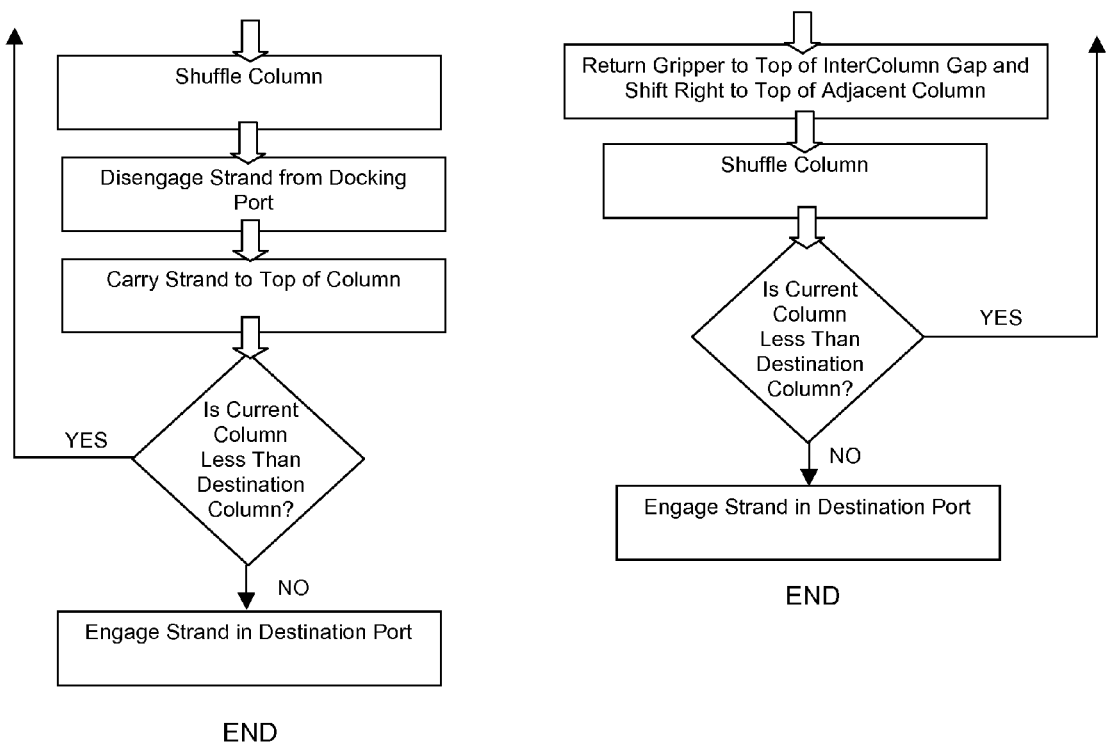

FIGS. 12A and 12B illustrate a flow chart of this sequence of steps. The user interface or remote control interface first inputs which pair of ports are to be reconfigured. Based on the database of existing connections between the input array 170 and the 1-D backbone 41, the processor 70 computes the shuffle pattern for the each row of the input port array according to the particular braid ordering convention of the switch. In this example we assume that the destination port is vacant, which may require a preliminary reconfiguration process to move the connector residing in the destination port to the docking port. Note that after the completion of the move from the starting to destination port, it may be necessary to remove the connector from the docking port and return it to the vacant starting port. This is true when the number of input ports is equal to the number of output ports, such that every reconfiguration consists of swapping two connectors.

The process in FIGS. 12A and 12B reaches a branching point dependent on whether the connector moves to the right or moves to the left across the input array. For a move to the right, the command sequence corresponds to FIG. 11 and for a move to the left, the command sequence corresponds to FIG. 10.

Figure 13:
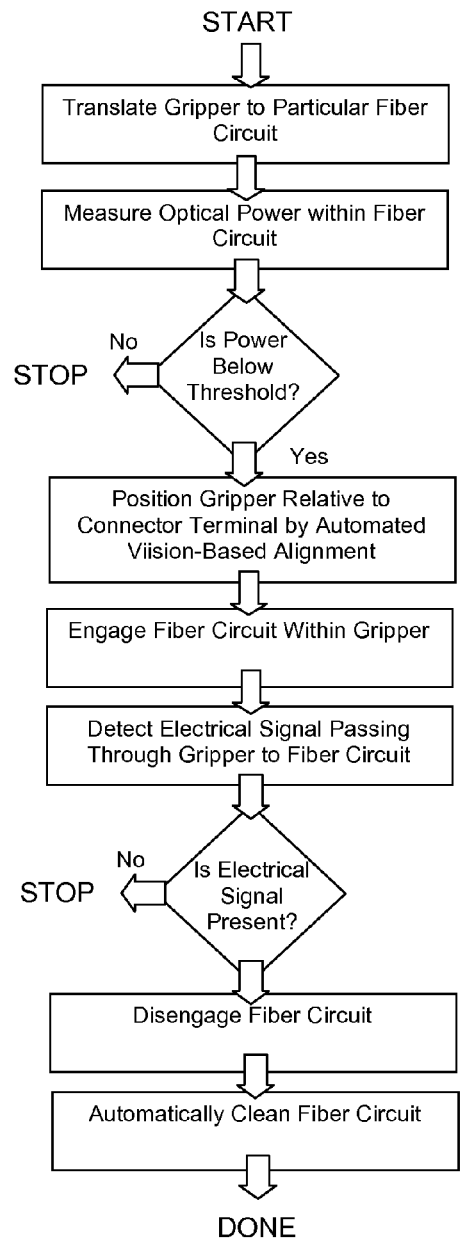
FIG. 13 is a flow chart of a high reliability method of reconfiguring fiber circuits.

The development of inherently reliable robotic reconfiguration processes requires redundant health monitoring internal to the cross-connect and in communication with controller 70 to ensure that proper fiber circuit connections are established. FIG. 13 illustrates a flow chart of a multi-modal process to confirm proper connections before disengaging a fiber circuit from the input terminal array. The first step is to translate the gripper 50 to a particular fiber circuit 21 to be reconfigured. The optical power within this fiber circuit should be measured next to confirm that there is no optical transmission of data passing through this fiber circuit. If an optical signal is detected, the reconfiguration process is halted. Otherwise, the process continues with the gripper being automatically positioned relative to connector terminal by a machine vision based alignment algorithm using pattern matching, for example, to align the camera integrated within gripper to a fiducial mark serving as a position reference for the particular terminal. Once the alignment is complete, the gripper engages the fiber circuit. After engagement, electrical conduction between gripper and conductive element of the fiber circuit is detected. If the electrical circuit is completed, the fiber circuit is properly engaged and latched within the gripper. Otherwise, the process terminates. After the successful completion of this step, the fiber circuit is disengaged from the connector terminal and its transport across the array is initiated. During this transport process, the polished fiber end-face of the fiber circuit can be automatically cleaned prior to insertion at a different terminal by an internal fiber cleaning apparatus.

In conclusion, we have disclosed methods to automatically reconfigure fiber circuits within an ordered yet arbitrary arrangement of intermixed fibers. These algorithms require a knowledge of the positions of all circuits within the interconnect volume at both the input plane and intermediate plane. Based on this knowledge and the application of ordering rules, any circuit can be arbitrary reconfigured any number of times.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method of reconfiguring optical fiber interconnections between input and output networks in a patch panel system having an input array for connectors receiving optical fibers from one network and output fibers for coupling to a second network comprising the steps of:
   storing information as to the addresses and routing of all existing interconnections between input and output arrays in the system;
   accepting reconfiguration commands as to desired changes to individual fiber interconnections that are to be made in the input array;
   in response to reconfiguration commands, engaging a selected connector at a chosen input array address;
   moving the selected connector to the reconfiguration position through existing interconnections between input and output in a non-entangling path using the stored information to interweave the connector and attached line through spaces in the existing interconnection, and
   installing the selected connector at the target destination address, in accordance with the reconfiguration command.

2. A method in accordance with claim 1 above, wherein the input array is disposed in columns and rows, including the further steps of:
   accessing the chosen connector at its existing location and transporting the connector along columnar pathways to a non-interconnecting location;
   temporarily storing the connector at the non-interconnecting location;
   shifting the columnar position of the connector relative to the array, and
   repeating the sequence of repositioning and transporting along columns and rows until the target column and row locations are attained.

3. A method as set forth in claim 2 above, wherein the connectors at the input array are distributed in a two-dimensional orthogonal pattern, wherein the steps include moving the rows incrementally under signal command and the fibers extending therefrom are collected in sets along a substantially linear axis at different elevations, the linear axis lying parallel to one of the column axes, and wherein the method further comprises the steps of moving the connector along selected columns and rows in timed relation to the row movements, connectors move laterally above or below a given row location where a preexisting interconnection exists, depending on the path of the fiber between input and output.

4. The method of distributing a plurality of optical fiber connections in an array which can be reconfigured with minimum interference with multiple fibers extending from the array, comprising the steps of:
   disposing the fiber connections in geometric zones said zones each having a plurality of individual internal addresses within the zone;
   reconfiguring a particular fiber connection from a selected address only to an address within the same zone in accordance with a deterministic algorithm.

5. A method in accordance with claim 4 wherein each zone remains a non-repeating braid following reconfiguration.

6. A method in accordance with claim 4 wherein the method includes the additional step of moving the fiber connection from the same zone to an adjacent zone and again reconfiguring the particular fiber connection from a selected address only to an address within the adjacent zone in accordance with a deterministic algorithm.

7. A method for robotically reconfiguring a patch panel for optical fibers, for interconnecting between arrays in a first plane and a second plane, the optical fibers being positioned removably in a two-dimensional array of connectors separated by column and row interstices, the fiber interconnections to the array in the second plane forming a linear array along a columnar axis, the method using a positioner movable under signal command in orthogonal directions relative to the first plane, and within the interstices between the connectors, wherein the method comprises the steps of:
  driving the positioner along columnar interstices under signal command to engage a selected fiber optic line adjacent the first plane;
  moving the engaged fiber optic line from the first plane to a column limit position in the first array;
  storing the fiber optic line at a column limit position;
  moving the positioner to a second column;
  engaging the stored fiber optic line in the stored position and advancing it for storage at a different location in a second column in the array;
  repeating the process until the selected fiber optic line is in a desired row and column position, and
  inserting the fiber optic line in the target location.

8. A system as set forth in claim 7 above, wherein the method includes the step of storing an inventory of interconnection vectors between the first array and the second array, and
  shifting the position of the terminals in rows in the array relative to their nominal columnar locations, before the fiber line approaches a lateral crossing point of an existing interconnection, to cause the fiber line to cross over or under an existing fiber vector in accordance with the vectoral data, in order to avoid entanglement.

9. A method in accordance with claim 7, wherein the method includes the step of automatically cleaning the fiber endface before inserting the fiber optic line in the target location.

10. A method in accordance with claim 7, wherein the step of engaging the stored fiber optic line in the stored position and advancing it for storage at a different location in the second column in the array is preceded by the step of measuring the optical power within the stored fiber optic circuit to confirm the circuit is dark.

11. A method in accordance with claim 7, wherein the step of engaging the stored fiber optic line in the stored position and advancing it for storage at a different location in the second column in the array is preceded by the step of performing an electrical continuity test to confirm that the positioner is properly engaging the stored fiber optic line.

12. A method for physically reconfiguring a connectorized fiber optic circuit, characterized by an address n, across an ordered array of input connector ports to which additional fiber optic circuits are terminated in an optical cross-connect system, consisting of the steps of:
  a. selecting a particular circuit n in column i to be reconfigured;
  b. selecting a particular destination connector port for circuit n in a column j within the array of input connector ports;
  c. disengaging the particular circuit n from its connector port;
  d. moving the particular circuit along a path that carries the particular circuit below the subset of fiber circuits with m>n in the direction of column j and above the subset of fiber circuits with m<n in the direction of column j;
  e. repeating the above process until the destination column j is reached;
  f. engaging the particular circuit n in the destination connector port such than the particular circuit lies to the left (right) of subset of fiber circuits with m>n and to the right (left) of the subset of fiber circuits with m<n.

13. A method in accordance with claim 12, wherein step f. is preceded by the step of automatically cleaning the fiber endface.

14. A method in accordance with claim 12, wherein step c. is preceded by the step of measuring the optical power within circuit n to confirm the fiber is dark.

15. A method in accordance with claim 12, wherein step c. is preceded by the step of performing an electrical continuity test to confirm that the gripper is properly engaging the particular circuit.

16. A method in accordance with claim 12, wherein steps c. and f. are both preceded by the step of aligning to the connector port utilizing a video camera-based automated alignment process.

17. A multi-step configuration process for a fiber optic cross-connect switch including multiple strands having a common volume and reconfigurably connected to a two-dimensional array of input terminals and potentially to one or more vacant docking ports, within the array, wherein first and second strands are exchanged between first and second terminals respectively, in the array, the process comprising the steps of:
  a. moving a first strand from a first terminal in the array to a selected docking port in the array;
  b. moving a second strand from its initial terminal in the array to the first terminal, and
  c. moving the first strand from the selected docking port to the second terminal in the array.

18. A multi-step fiber cross-connect reconfiguration process executed by automatic control of a gripper actuator and lateral translations of independent rows of input connector array and row of docking ports, based on commands generated by a controller, the controller computing motion control steps based on a stored database of vector locations of the multiplicity of ordered fiber strand vectors converging towards a common axis, comprising the following steps:
  a. controller reads user input first port and second port for the pair of fiber strands to be exchanged;
if the second port column number is greater than the first port column number,
  b. controller computes shuffle pattern of particular column;
  c. controller directs rows of input array to shuffle;
  d. gripper moves to particular column;
  e. gripper disengages first strand from row;
  f. gripper carries strand outside of particular column;
  g. gripper shifts strand to intercolumn gap;
  h. gripper engages strand in docking port;
  i. gripper returns exits particular column and shifts to adjacent column;
  j. row of docking ports shifts;
  k. controller computes shuffle pattern of particular column;
  l. controller directs rows of input array to shuffle;
  m. gripper disengages strand from docking port;
  n. gripper carries strand outside of column;
  o. if current column is not equal to destination column, process returns to step b;
  p. gripper engages strand in destination port
if the second port column number is less than the first port column number,
  q. controller computes shuffle pattern of particular column;
  r. controller directs rows of input array to shuffle;
  s. gripper moves to particular column;
  t. gripper disengages first strand from row;
  u. row of docking port shifts;
  v. gripper engages strand in docking port;

w. gripper exits intercolumn gap and shifts to next column;
x. docking port shifts;
y. rows unshuffle;
z. strand disengages from docking port;
aa. gripper exits intercolumn gap and moves to next column;
bb. rows shuffle according to requirements of next column;
cc. if current column is not equal to destination column, process returns to step q;
dd. gripper engages strand in destination port.

19. A high reliability and redundant method of robotically disengaging fiber circuits from connector terminals within large scale, all-fiber optical cross-connect switches using an internal gripper element internal to an interconnection volume, wherein the process of disengaging a particular fiber circuit within the cross-connect volume consists of the steps of:

measuring the optical power propagating through the particular fiber circuit to confirm that the optical power level lies below a predefined threshold value, or otherwise returning an error message;

positioning the internal gripper relative to the connector terminal currently storing the particular fiber circuit, by processing real time video images collected from camera internal to gripper and automatically aligning the gripper to the connector terminal based on video feedback;

engaging the particular fiber circuit within the gripper;

detecting the presence of an electrical signal passing through the fiber circuit and into the gripper to confirm the correct fiber circuit is fully engaged within the gripper and prepared for transport, or otherwise returning an error message;

disengaging the particular fiber circuit from terminal if the electrical signal is present.

20. A high reliability method in accordance with claim 19 with the additional step of automatically cleaning the fiber endface of the particular fiber circuit internal to cross-connect volume subsequent to disengaging the particular fiber circuit.

* * * * *